(12) United States Patent
Kim et al.

(10) Patent No.: US 9,007,316 B2
(45) Date of Patent: Apr. 14, 2015

(54) DISPLAY DEVICE WITH INTEGRATED TOUCH SCREEN

(71) Applicant: LG Display Co., Ltd., Seoul (KR)

(72) Inventors: Hoon Bae Kim, Gyeonggi-do (KR); Ju Han Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 203 days.

(21) Appl. No.: 13/675,149

(22) Filed: Nov. 13, 2012

(65) Prior Publication Data

US 2013/0335342 A1    Dec. 19, 2013

(30) Foreign Application Priority Data

Jun. 13, 2012    (KR) .................... 10-2012-0063346

(51) Int. Cl.
   *G06F 3/044*    (2006.01)
   *G02F 1/13*    (2006.01)
   *G06F 3/041*    (2006.01)
(52) U.S. Cl.
   CPC ....... *G06F 3/044* (2013.01); *G02F 1/13* (2013.01); *G06F 3/0412* (2013.01); *G06F 3/0416* (2013.01)

(58) Field of Classification Search
   CPC combination set(s) only.
   See application file for complete search history.

(56) References Cited

U.S. PATENT DOCUMENTS

| 7,859,521 | B2  | 12/2010 | Hotelling et al. |
| 2006/0087488 | A1 | 4/2006 | Ito |
| 2006/0145995 | A1* | 7/2006 | Kim et al. ............. 345/98 |
| 2014/0062990 | A1* | 3/2014 | Zhang ................. 345/212 |

FOREIGN PATENT DOCUMENTS

KR    20060049108 A    5/2006

* cited by examiner

*Primary Examiner* — Van Chow
(74) *Attorney, Agent, or Firm* — Morgan, Lewis & Bockius LLP

(57) ABSTRACT

A display device with integrated touch screen is provided. The display device may include a panel and a touch IC. The panel may include a plurality of driving electrodes and sensing electrodes. The touch IC may compensate for a feedback common voltage outputted from the panel by generating a compensation common voltage based on the feedback common voltage and applying the compensation common voltage to the driving electrodes and the sensing electrodes when the panel operates in a display driving mode.

18 Claims, 4 Drawing Sheets

DISPLAY DEVICE WITH INTEGRATED TOUCH SCREEN

CROSS-REFERENCE TO RELATED APPLICATIONS

This application claims the benefit of the Korean Patent Application No. 10-2012-0063346 filed on Jun. 13, 2012, which is hereby incorporated by reference as if fully set forth herein.

BACKGROUND

1. Field of the Disclosure

Embodiments of the present invention relate to a display device, and more particularly, to a display device with integrated in-cell type touch screen.

2. Discussion of the Related Art

Touch screens are a type of input device that may be included in display devices such as Liquid Crystal Displays (LCDs), Field Emission Displays (FEDs), Plasma Display Panel (PDPs), Electroluminescent Displays (ELDs), and Electrophoretic Display (EPDs), and may enable a user to input information by directly touching a screen with a finger, a pen or the like while looking at the screen of the display device.

Particularly, the demand of display devices with an integrated in-cell type touch screen, which may include a plurality of built-in elements configuring the touch screen, is recently increasing. Such display devices may be used in slim-profile portable terminals such as smart phones and tablet Personal Computers (PCs)

In a related art display device with an integrated in-cell type touch screen disclosed in U.S. Pat. No. 7,859,521, a plurality of common electrodes for a display are segmented into a plurality of touch driving areas and touch sensing areas, thereby allowing a mutual capacitance to be generated between the touch driving area and the touch sensing area. Therefore, the related art display device measures the change of a mutual capacitance that occurs from a touch, and thus determines whether there is a touch.

In other words, in the related art display device with an integrated in-cell type touch screen, a plurality of common electrodes for the display perform the function of a touch electrode when a panel operates in a touch driving mode. This allows the display device to perform both a display function and a touch function, where the display and touch functions may appear simultaneous to a user.

When a panel operates in a display driving mode, a common voltage is applied to a plurality of common electrodes that also perform the function of touch electrodes. However, a common voltage difference may occur, for example, between one end of a common electrode to which the applied common voltage is first transferred, and another end of the common electrode to which the applied common voltage is last transferred.

This common voltage difference may be caused by the internal resistance and capacitance components of each common electrode, and the change in the alternating current (AC) component and direct current (DC) component of the common voltage that occurs according to an image realized by the panel. The common voltage difference may cause flickering and image sticking defects. Therefore, a compensation circuit that compensates for the common voltage is generally used.

In LCDs of the related art, common electrodes are formed as one body and are connected to each other, and it is possible to implement one common voltage compensation circuit.

However, in display devices with an integrated in-cell type touch screen of the related art, common electrodes are typically divided into a plurality of driving electrodes and sensing electrodes for performing a touch function. In such devices, it may be complicated and difficult to implement a common voltage compensation circuit.

SUMMARY

Accordingly, embodiments of the present invention are directed to providing a display device with an integrated in-cell type touch screen that substantially obviates one or more problems due to limitations and disadvantages of the related art.

An aspect of embodiments of the present invention is directed to providing a display device with an integrated touch screen that can stably perform a display function by virtue of a common voltage compensation circuit built into a touch integrated circuit (IC).

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there may be provided a display device with integrated touch screen including a panel including a plurality of driving electrodes and sensing electrodes; and a touch integrated circuit (IC) compensating for a feedback common voltage outputted from the panel by generating a compensation common voltage and applying the compensation common voltage to the driving electrodes and the sensing electrodes when the panel operates in a display driving mode.

In another aspect of an embodiment of the present invention, there is provided a method of driving a display device with an integrated touch screen, the display device including a panel and a touch integrated circuit, the panel including a plurality of driving electrodes and sensing electrodes, where the method may include the touch IC receiving a feedback common voltage outputted from the panel; the touch IC generating a compensation common voltage based on the feedback common voltage; and while the panel operates in a display driving mode, the touch IC applying the compensation common voltage to the driving electrodes and the sensing electrodes.

It is to be understood that both the foregoing general description and the following detailed description of embodiments of the present invention are exemplary and explanatory and are intended to provide further explanation of the embodiments of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of embodiments of the invention. In the drawings.

DETAILED DESCRIPTION

Reference will now be made in detail to the exemplary embodiments of the present invention, examples of which are illustrated in the accompanying drawings. The same reference numbers may be used throughout the drawings to refer to the same or like parts.

Hereinafter, embodiments of the present invention will be described in detail with reference to the accompanying drawings.

In the following description, for brevity, a display device with an integrated touch screen according to embodiments of the present invention will be exemplarily described as being an LCD device, but embodiments of the present invention are not limited thereto. Embodiments of the present invention may be applied to various display devices such as, for example, FEDs, PDPs, ELDs, EPDs, etc. A description of the general configuration of an LCD device is not provided.

Figure 1:
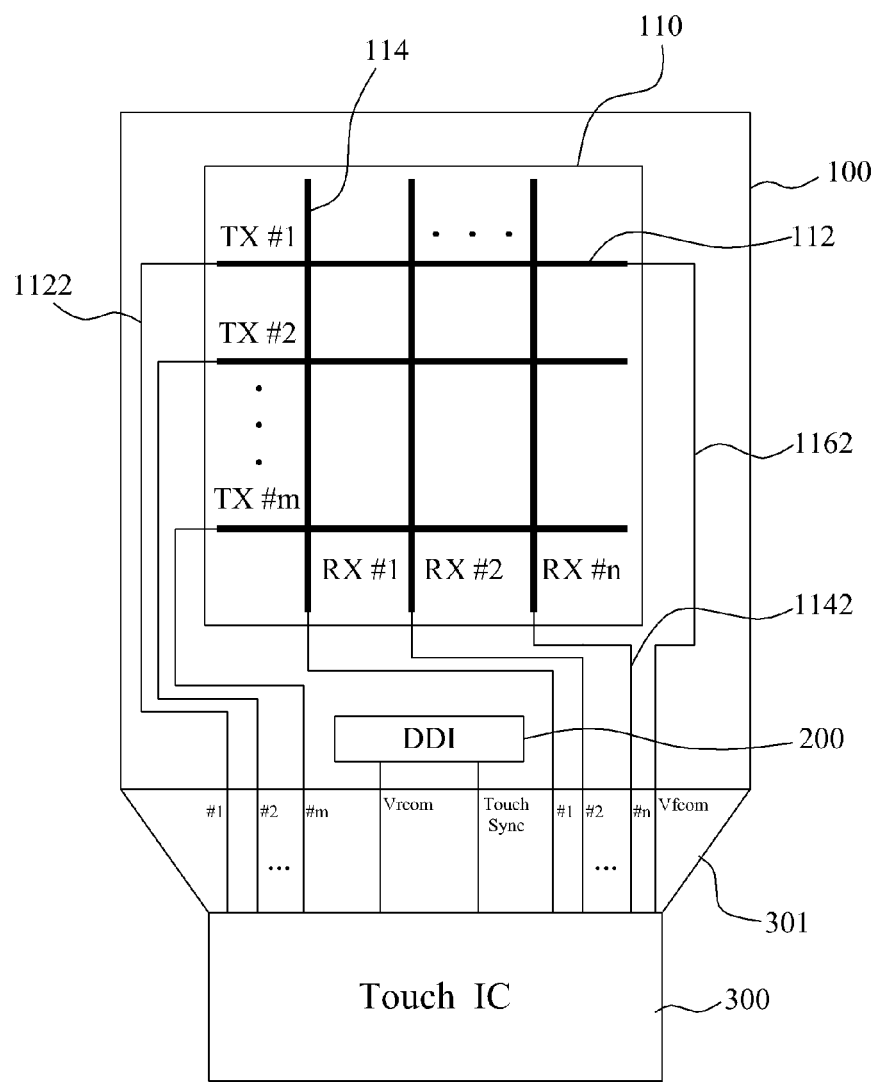
FIG. 1 is a diagram schematically illustrating an exemplary configuration of a display device with an integrated touch screen according to an embodiment of the present invention.

FIG. 1 is a diagram schematically illustrating a configuration of a display device with an integrated touch screen according to an embodiment of the present invention.

As illustrated in FIG. 1, the display device with the integrated touch screen may include a panel 100, a display driver IC 200, and a touch IC 300.

A touch screen 110 may be built into the panel 100. The touch screen 110 may include a plurality of driving electrodes 112 and a plurality of sensing electrodes 114.

In an embodiment, when the display device with the integrated touch screen is driven in a display mode, the driving electrodes 112 and the sensing electrodes 114 may perform the function of a common electrode. However, when the display device with the integrated touch screen is driven in a touch mode, the driving electrodes 112 may perform the function of a touch driving electrode, and the sensing electrodes 114 may perform the function of a touch sensing electrode.

In other words, the driving electrodes and sensing electrodes of the display device with the integrated touch screen according to embodiments of the present invention may perform a touch function as well as a display function.

In an embodiment of the present invention, the display device may compensate for a feedback common voltage Vfcom that may be outputted from any one of the plurality of driving electrodes 112, by generating a compensation common voltage Vccom and applying the compensation common voltage Vccom to the plurality of driving electrodes 112 and sensing electrodes 114.

To this end, the respective driving electrodes 112 may be connected to the touch IC 300 through a plurality of driving electrode lines 1122, and the respective sensing electrodes 114 may be connected to the touch IC 300 through a plurality of sensing electrode lines 1142. Any one of the driving electrodes 112 may be connected to the touch IC 300 through a feedback common voltage signal line 1162.

Therefore, when the panel 100 operates in the display driving mode, the feedback common voltage Vfcom may be applied to the touch IC 300 through the feedback common voltage signal line 1162, and the compensation common voltage Vccom outputted from the touch IC 300 may be applied to a driving electrode 112 through a driving electrode line 1122 and may be applied to a sensing electrode 114 through a sensing electrode line 1142.

Moreover, when the panel 100 operates in the touch driving mode, a driving voltage outputted from the touch IC 300 may be applied to a driving electrode 112 through a driving electrode line 1122, and a sensing signal from a sensing electrode 114 may be inputted to the touch IC 300 through a sensing electrode line 1142.

Here, the feedback common voltage Vfcom may be outputted from any one of the driving electrodes 112. For example, the compensation common voltage Vccom outputted from the touch IC 300 may be applied to one end of each of the driving electrodes 112 through the respective driving electrode lines 1122, and the feedback common voltage Vfcom may be outputted from the other end of a driving electrode that is the farthest away from the touch IC 300 among the driving electrodes 112 to which the compensation common voltage Vccom is applied through the respective driving electrode lines 1122.

For example, a common voltage outputted from the touch IC 300 may be applied to a driving electrode 112 through a driving electrode line 1122 and applied to a sensing electrode 114 through a sensing electrode line 1142, but a difference may occur between the common voltages due to the internal resistance and capacitance components of each of the driving electrode line 1122 and sensing electrode line 1142. In this case, one end of each of the sensing electrodes 114 may be disposed near the touch IC 300, causing a difference between the common voltages to be small. However, in the driving electrodes 112, a difference between common voltages may be large.

Accordingly, the common voltage can be simply compensated for by compensating for a feedback common voltage that is outputted from the driving electrode farthest away from the touch IC 300, without needing to compensate for a feedback common voltage outputted from each of the plurality of driving electrodes 112 and sensing electrodes 114.

In an embodiment, the driving electrodes 112 may be formed in parallel in a width direction that may be the direction of a gate line (not shown) in the panel 100. Each of the sensing electrodes 114 may be disposed between adjacent sub driving electrodes among a plurality of sub driving electrodes (not shown), and formed in parallel in a height direction that may be the direction of a data line (not shown) in the panel 100.

For example, the driving electrodes 112 may include first to mth driving electrodes TX#1 to TX#m, and each of the driving electrodes 112 may include n+1 number of sub driving electrodes (not shown). Also, the sensing electrodes 114 may include first to nth sensing electrodes RX#1 to RX#n. In order to configure one driving electrode, the sub driving electrodes (not shown) may be electrically connected to a plurality of driving electrode connection lines (not shown), respectively.

Here, the driving electrode connection lines (not shown) may be respectively connected to the sub driving electrodes through a plurality of contact holes. On the other hand, the driving electrode connection lines are formed on a layer which differs from that of the sensing electrodes 114, and thus are not electrically connected to the sensing electrodes 114.

Each of the driving electrodes 112 may be formed as a plurality of block-type common electrodes that are formed to be overlapped with a plurality of unit pixel areas, and each of the sensing electrodes 114 may be formed as one block-type common electrode that is formed to be overlapped with another plurality of unit pixel areas.

In other words, in embodiments of the present invention, the sub driving electrodes (not shown) and the sensing electrodes 114 may be formed as one common electrode over a plurality of unit pixel groups, and may be electrically connected to each other.

The driving electrodes 112 and the sensing electrodes 114 may act as common electrodes for driving the liquid crystal, and thus may be formed of a transparent material such as indium tin oxide (ITO).

Moreover, in embodiments of the present invention, a common electrode may be formed in units of unit pixel groups, but is not limited thereto. As another example, a common electrode may be formed in units of one unit pixel, in which case a sub driving electrode and a sensing electrode that perform the function of the common electrode may be electrically connected through a connection line.

In embodiments of the present invention, the display driver IC 200 may control a plurality of data lines and gate lines.

Moreover, the display driver IC 200 may generate a gate control signal and a data control signal with a timing signal transmitted from an external system, and may realign input video data signals to be matched with the pixel structure of the panel 100, for outputting an image through the panel 100.

In an embodiment as illustrated in FIG. 1, an LCD with an integrated touch screen may include: a panel 100 with a built-in touch screen 110; a display driver IC (DDI) 200 that is connected to an external system (not shown) and controls a plurality of gate lines and data lines formed in the panel 100; a touch IC 300 that drives the touch screen 110 built in the panel 100; a flexible printed circuit (FPC, not shown) for DDI that connects the external system (not shown) to the DDI 200; and an FPC 301 for the touch IC that connects the touch screen 110 and the touch IC 300.

When the panel 100 operates in a display driving mode, the touch IC 300 may compensate for a feedback common voltage Vfcom outputted from the panel 100 by generating a compensation common voltage Vccom, and applying the compensation common voltage Vccom to a plurality of driving electrodes and sensing electrodes.

Moreover, when the panel 100 operates in a touch driving mode, the touch IC 300 may generate a driving voltage and apply the driving voltage to a plurality of driving electrodes, and may receive a plurality of sensing signals from respective sensing electrodes to determine whether there is a touch.

Hereinafter, the touch IC will be described in more detail with reference to FIGS. 2 and 3.

Figure 2:
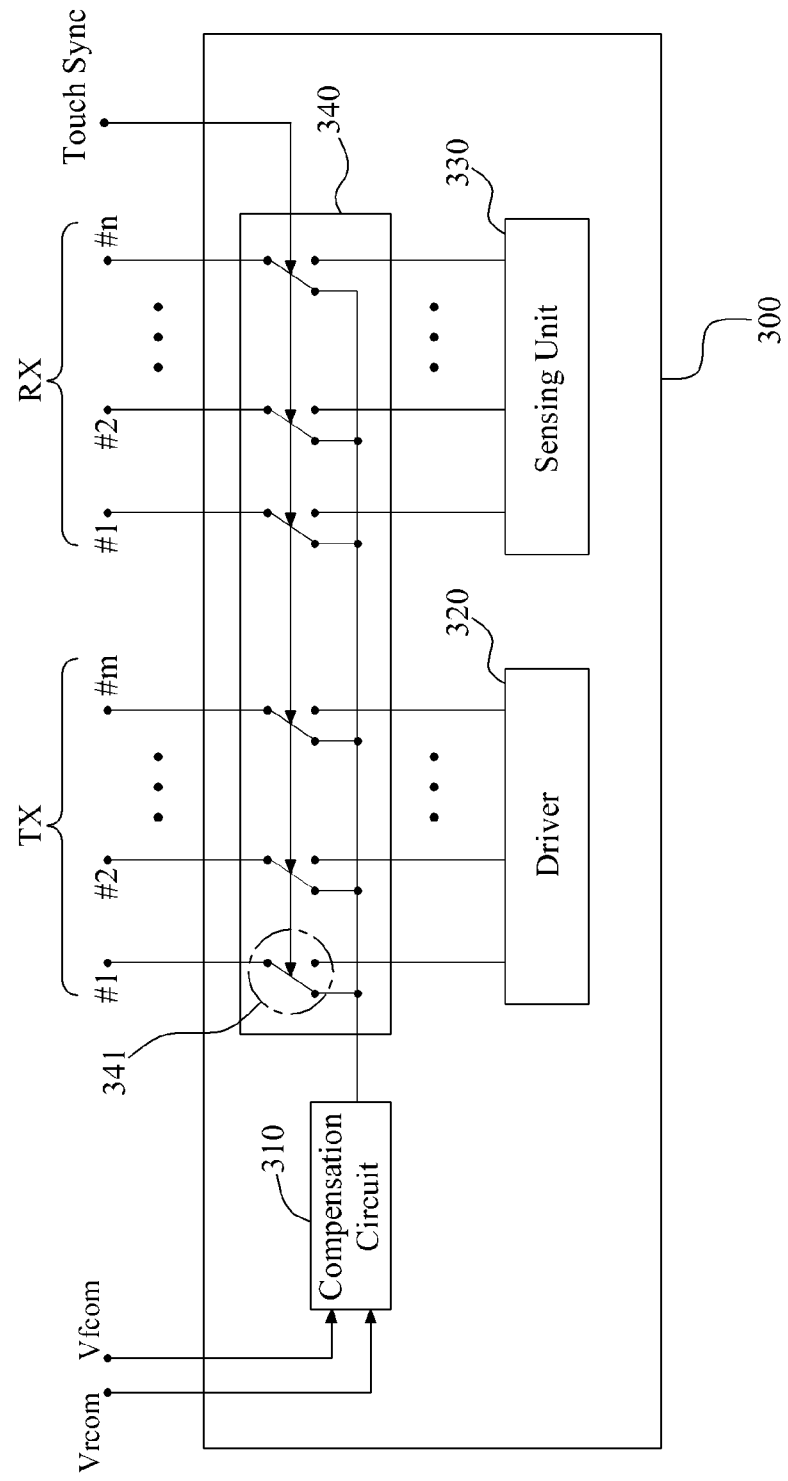
FIGS. 2 and 3 are diagrams illustrating an exemplary configuration of a touch IC according to embodiments of the present invention.
Figure 3:
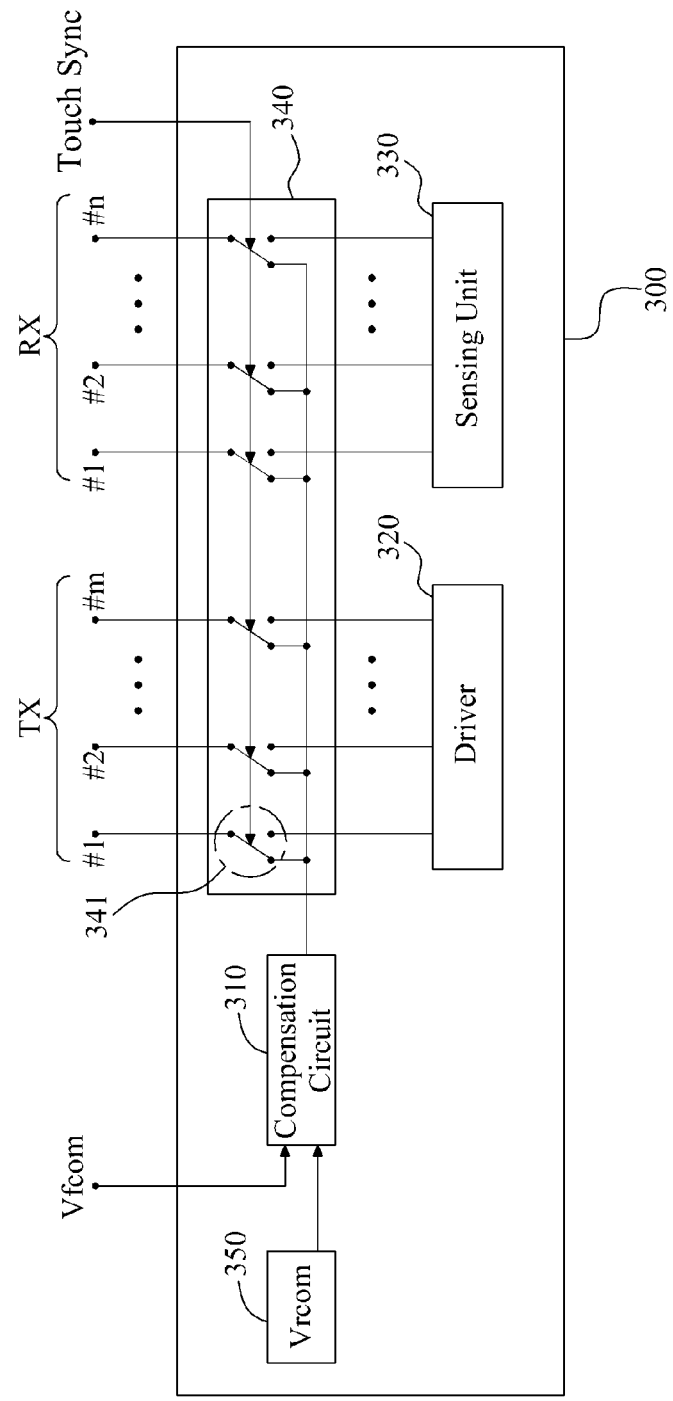

FIGS. 2 and 3 are diagrams illustrating an exemplary configuration of a touch IC according to embodiments of the present invention.

The touch IC 300, as illustrated in FIG. 2, may include a compensation circuit 310, a driver 320, a sensing unit 330, and a switching unit 340. Alternatively, as illustrated in FIG. 3, the touch IC 300 may further include a reference common voltage generator 350, in addition to the elements of FIG. 2.

As illustrated in FIGS. 1 and 2, a reference common voltage Vrcom may be generated outside the touch IC 300 (for example, in the display driver IC 200) and inputted to the touch IC 300. Alternatively, as illustrated in FIG. 3, the reference common voltage Vrcom may be generated autonomously inside the touch IC 300.

In embodiments as shown in FIG. 3, the reference common voltage generator 350 may generate the reference common voltage Vrcom that is used by the compensation circuit 310 to generate the compensation common voltage Vccom.

The reference common voltage Vrcom is a common voltage that may be applied to all common electrodes, and the compensation circuit 310 may generate the compensation common voltage Vccom using this reference common voltage Vrcom and the feedback common voltage Vfcom.

The compensation circuit 310 will now be described in more detail with reference to FIG. 4.

Figure 4:
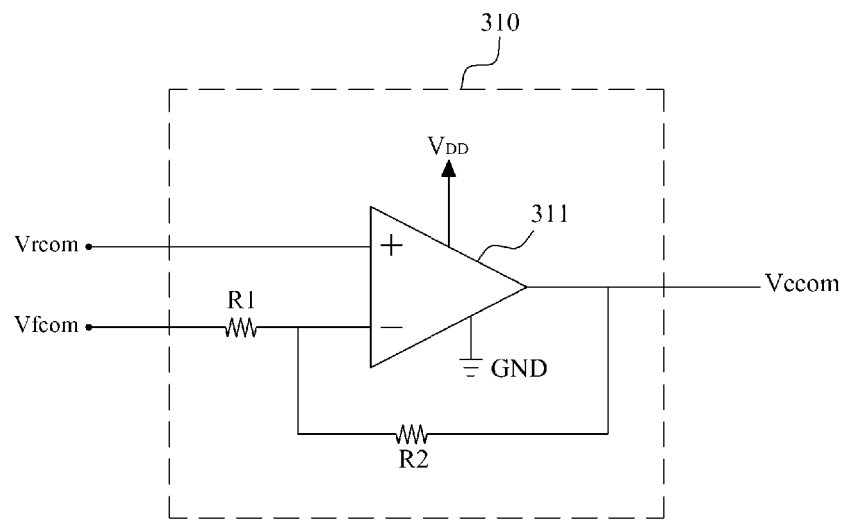
FIG. 4 is a diagram schematically illustrating an exemplary configuration of a compensation circuit of a display device with an integrated touch screen according to an embodiment of the present invention.

FIG. 4 is a diagram schematically illustrating an exemplary configuration of the compensation circuit of the display device with an integrated touch screen according to an embodiment of the present invention.

The compensation circuit 310, as illustrated in FIGS. 2 and 3, may include an amplifier circuit having an operational amplifier 311.

In detail, the compensation circuit 310 may include a driving voltage input channel that receives a driving voltage $V_{DD}$ and a ground voltage GND; a non-inverting input channel that receives the reference common voltage Vrcom; an inverting input channel to which a first resistor R1 receiving the feedback common voltage Vfcom and a second resistor R2 receiving the compensation common voltage Vccom are connected in parallel; and an output channel through which the compensation common voltage Vccom is outputted. Here, the second resistor R2 may determine a gain rate corresponding to the feedback common voltage Vfcom.

Referring back to FIGS. 2 and 3, the driver 320 may generate a driving voltage, and the sensing unit 330 may receive a plurality of sensing signals to determine whether there is a touch. The touch IC 300, as illustrated in FIGS. 2 and 3, may include the driver 320, the sensing unit 330, and the switching unit 340.

The driver 320 may generate the driving voltage and output the driving voltage to the switching unit 340. The sensing unit 330 may receive the sensing signals from the switching unit 340 to determine whether there is a touch. As shown in FIG. 2, the switching unit 340 may selectively connect a) the compensation circuit 310 or b) the driver 320 and the sensing unit 330 to the plurality of driving electrodes 112 and sensing electrodes 114 according to the sync signal "Touch Sync".

Here, the sync signal "Touch Sync" includes a first sync signal that indicates the display driving mode, and a second sync signal that indicates the touch driving mode.

FIGS. 2 and 3 illustrate embodiments where the sync signal "Touch Sync" may be generated by the display driver IC 200 and inputted from outside the touch IC 300. However, in other embodiments, the sync signal "Touch Sync" may be generated autonomously inside the touch IC 300.

For example, the display driver IC 200 or the touch IC 300 may generate the first sync signal that indicates the display driving mode at an image output time during which the panel 100 operates in the display driving mode. Furthermore, the display driver IC 200 or the touch IC 300 may generate the second sync signal that indicates the touch driving mode at a touch sensing time during which the panel 100 operates in the touch driving mode.

Therefore, when the panel 100 operates in the display driving mode, the first sync signal may be inputted to the switching unit 340, and when the panel 100 operates in the touch driving mode, the second sync signal may be inputted to the switching unit 340

For example, when the first sync signal is inputted, the switching unit 340 connects the plurality of driving electrodes and sensing electrodes to the compensation circuit 310, and when the second sync signal is inputted, the switching unit 340 connects the driving electrodes to the driver 320 and connects the sensing electrodes to the sensing unit 330.

In other words, when the panel 100 operates in the display driving mode, the compensation circuit 310 may apply the compensation common voltage Vccom to the driving electrodes and the sensing electrodes such that the driving electrodes and the sensing electrodes perform the function of a common electrode.

Moreover, when the panel 100 operates in the touch driving mode, in order for the driving electrodes and the sensing electrodes to perform the function of a touch electrode, the driver 320 may apply the driving voltage to the driving electrodes, and the sensing unit 330 may receive a plurality of sensing signals from the respective sensing electrodes to determine whether there is a touch.

In an embodiment, the switching unit 340 includes a plurality of switches 341 that are respectively connected to the plurality of driving electrodes 112 and sensing electrodes 114. Here, the plurality of switches 341 may be connected to the driving electrodes 112 and the sensing electrodes 114 in a one-to-one correspondence relationship.

The number of switches included in the switching unit 340 may be equal to the total number of driving electrodes and sensing electrodes that are built in the panel 100.

As described above, in the display device with an integrated in-cell type touch screen according to an embodiment of the present invention, a function that generates a compensation common voltage and switches the compensation common voltage may be built in the touch IC. Accordingly, in the display device with the integrated in-cell type touch screen, a common voltage compensation circuit can be easily implemented, a circuit may be stabilized, and cost can be saved by the integration of the compensation circuit.

Hereinafter, the output of the touch IC based on the driving mode of the panel will be described in detail with reference to FIG. 5.

Figure 5:
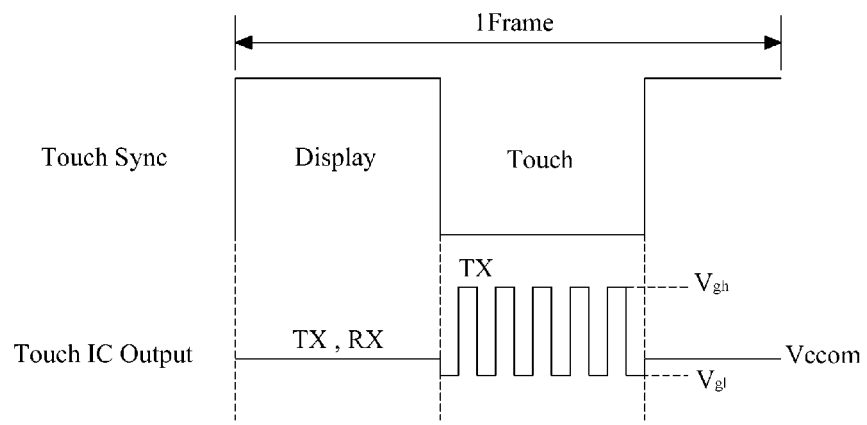
FIG. 5 is a timing chart showing an exemplary output of a touch IC based on a driving mode of a panel in a display device with an integrated touch screen according to an embodiment of the present invention.

FIG. 5 is a timing chart showing an output of a touch IC based on a driving mode of a panel in a display device with an integrated touch screen according to an embodiment of the present invention.

Here, a driving electrode and a receiving electrode that are built in the panel 100 may perform the function of a common electrode and the function of a touch electrode, and thus, the display device with an integrated touch screen according to embodiments of the present invention may divide time and performs time-division driving according to the display driving mode and the touch driving mode.

Therefore, as illustrated in FIG. 5, one frame in time-division driving may be divided into a display session (in which the panel 100 operates in the display driving mode according to the sync signal) and a touch session (in which the panel 100 operates in the touch driving mode according to the sync signal). In this case, touch driving may be turned off in the display session, and display driving may be turned off in the touch session, thus minimizing signal interference between the display session and the touch session.

Moreover, as illustrated in FIG. 5, the compensation common voltage Vccom may be outputted to the driving electrodes in the display session. Here, in the display session, all the driving electrodes and sensing electrodes may perform the function of a common electrode, and thus, a voltage having the same level as that of the compensation common voltage Vccom outputted to a driving electrode may be applied to a sensing electrode.

For example, when the compensation circuit 310 is not built in the touch IC 300, the touch IC 300 may output the reference common voltage Vrcom. However, in the display device with an integrated touch screen according to an embodiment of the present invention, because the compensation circuit 310 is built in the touch IC 300, the touch IC 300 may output the compensation common voltage Vccom that is generated by compensating for the feedback common voltage Vfcom, in the display session.

In the touch session, as illustrated in FIG. 5, the touch IC 300 outputs a driving voltage having a driving pulse type, which has the maximum voltage Vgh and the minimum voltage Vgl, to the driving electrodes.

According to embodiments of the present invention, a function that generates a compensation common voltage and switches the compensation common voltage may be built in the touch IC. Accordingly, in display devices with an integrated in-cell type touch screen, a common voltage compensation circuit can be easily implemented, a circuit may be stabilized, and cost can be saved by the integration of the compensation circuit.

Moreover, according to embodiments of the present invention, a compensation circuit can be easily implemented by using a feedback common voltage outputted from any one of the plurality of driving electrodes without needing to use feedback common voltages that are respectively outputted from the plurality of sensing electrodes and driving electrodes that perform the function of a common electrode.

It will be apparent to those skilled in the art that various modifications and variations can be made in embodiments of the present invention without departing from the spirit or scope of embodiments of the invention. Thus, it is intended that embodiments of the present invention cover the modifications and variations of the invention provided they come within the scope of the appended claims and their equivalents.

What is claimed is:

1. A display device with integrated touch screen, comprising:
    a panel including a plurality of driving electrodes and sensing electrodes; and
    a touch integrated circuit (IC) configured to compensate for a feedback common voltage outputted from the panel by generating a compensation common voltage based on the feedback common voltage and applying the compensation common voltage to the driving electrodes and the sensing electrodes when the panel operates in a display driving mode,
    wherein during the display driving mode, the compensation common voltage is applied to respective first ends of the driving electrodes, and the feedback common voltage is outputted from a second, opposite end of the driving electrode that is farthest away from the touch IC among the driving electrodes to which the compensation common voltage is applied.

2. The display device of claim 1, wherein the touch integrated circuit includes a compensation circuit, and the compensation circuit generates the compensation common voltage based on the feedback common voltage and a reference common voltage.

3. The display device of claim 2, wherein the compensation circuit is built into the touch IC, and includes:
    an amplifier circuit having an operational amplifier, the operational amplifier including a non-inverting input channel that receives the reference common voltage, an inverting input channel to which a first resistor receiving the feedback common voltage and a second resistor receiving the compensation common voltage are connected in parallel, and an output channel through which the compensation common voltage is outputted.

4. The display device of claim 2, the touch IC further including:
- a switching unit;
- a driver configured to generate a driving voltage and output the driving voltage to the switching unit; and
- a sensing unit configured to receive a plurality of sensing signals from the sensing electrodes and determine whether there is a touch during a touch driving mode.

5. The display device of claim 4, wherein the switching unit is configured to use a touch sync signal to switch between the display driving mode and the touch driving mode.

6. The display device of claim 4, wherein the switching unit is configured to connect the driving and sensing electrodes to the compensation circuit during the display driving mode, whereby the driving and sensing electrodes receive the compensation common voltage.

7. The display device of claim 4, wherein the switching unit is configured to connect the driving and sensing electrodes to the driver and sensing unit, respectively, during the touch driving mode, whereby the driving electrodes receive the driving voltage and the sensing unit receives the plurality of sensing signals from the sensing electrodes.

8. The display device of claim 2, wherein the reference common voltage is generated by a reference common voltage generator included in the touch IC, or the reference common voltage is generated outside the touch IC and inputted to the touch IC.

9. The display device of claim 1, wherein when the display device is driven in the display driving mode, the driving electrodes and the sensing electrodes perform the function of a common electrode, and when the display device is driven in a touch driving mode, the driving electrodes perform the function of a touch driving electrode and the sensing electrodes perform the function of a touch sensing electrode.

10. The display device of claim 1, wherein each of the driving electrodes is formed as a plurality of block-type common electrodes, and each of the sensing electrodes is formed as one block-type common electrode.

11. A method of driving a display device with an integrated touch screen, the display device including a panel and a touch integrated circuit, the panel including a plurality of driving electrodes and sensing electrodes, comprising:
- the touch IC receiving a feedback common voltage outputted from the panel;
- the touch IC generating a compensation common voltage based on the feedback common voltage; and
- while the panel operates in a display driving mode, the touch IC applying the compensation common voltage to the sensing electrodes and respective first ends of the driving electrodes, and the feedback common voltage being outputted from a second, opposite end of the driving electrode that is farthest away from the touch IC among the driving electrodes to which the compensation common voltage is applied.

12. The method of claim 11, wherein the touch integrated circuit includes a compensation circuit, and
- while the panel operates in the display driving mode, the compensation circuit generating the compensation common voltage based on the feedback common voltage and a reference common voltage.

13. The method of claim 12, further comprising:
- a reference common voltage generator generating the reference common voltage, the reference common voltage generator being inside the touch IC; or
- the touch IC receiving the reference common voltage from outside the touch IC.

14. The method of claim 11, wherein the touch IC further includes a switching unit, a sensing unit, and a driver; and
- while the panel operates in a touch driving mode, the driver generating a driving voltage and outputting the driving voltage to the switching unit, and the sensing unit receiving a plurality of sensing signals from the sensing electrodes and determining whether there is a touch.

15. The method of claim 14, further comprising:
- the switching unit receiving a touch sync signal and switching between the display driving mode and the touch driving mode based on the touch sync signal.

16. The method of claim 14, further comprising:
- while the panel operates in the display driving mode, the switching unit connecting the driving and sensing electrodes to the compensation circuit, and the driving and sensing electrodes receiving the compensation common voltage from the compensation circuit.

17. The method of claim 14, further comprising:
- while the panel operates in the touch driving mode, the switching unit connecting the driving and sensing electrodes to the driver and sensing unit, respectively,
- the driving electrodes receiving the driving voltage from the driver, and the sensing unit receiving the plurality of sensing signals from the sensing electrodes.

18. The method of claim 11, further comprising:
- while the panel operates in the display driving mode, the driving electrodes and the sensing electrodes performing the function of a common electrode, and
- while the panel operates in a touch driving mode, the driving electrodes performing the function of a touch driving electrode and the sensing electrodes performing the function of a touch sensing electrode.

* * * * *